(12) United States Patent
Tokutsu

(10) Patent No.: US 6,271,484 B1
(45) Date of Patent: Aug. 7, 2001

(54) WEIGHING APPARATUS HAVING AN AUTOMATIC FILTER ADJUSTING CAPABILITY

(75) Inventor: Harunori Tokutsu, Kurita-gun (JP)

(73) Assignee: Ishida Co., Ltd., Kurita-gun (JP)

( * ) Notice: Subject to any disclaimer, the term of this patent is extended or adjusted under 35 U.S.C. 154(b) by 0 days.

(21) Appl. No.: 09/166,115

(22) Filed: Oct. 5, 1998

(30) Foreign Application Priority Data

Oct. 8, 1997 (JP) .................................................... 9-275709

(51) Int. Cl.$^7$ .......................... G01G 19/34; G01G 13/00; G01G 23/01

(52) U.S. Cl. .................................. 177/25.13; 177/25.18; 177/185; 702/101; 702/85

(58) Field of Search .............................. 177/25.11, 25.12, 177/25.13, 25.14, 25.18, 25.19, 50, 184, 185, 1; 702/85, 101, 102; 73/1.13

(56) References Cited

U.S. PATENT DOCUMENTS

| | | | | |
|---|---|---|---|---|
| 3,643,753 | * | 2/1972 | Godwin et al. ....................... | 177/185 |
| 3,731,526 | * | 5/1973 | Games ................................... | 702/76 |
| 4,529,050 | * | 7/1985 | Mosher et al. ........................... | 177/1 |
| 4,535,854 | * | 8/1985 | Gard et al. .............................. | 177/1 |
| 4,570,728 | * | 2/1986 | Toyoda ................................ | 177/25.13 |
| 4,705,126 | * | 11/1987 | Naito ................................... | 177/185 |
| 4,730,499 | * | 3/1988 | Gianella et al. ........................ | 177/185 |
| 4,825,965 | * | 5/1989 | Inoue et al. ............................... | 177/1 |
| 4,977,526 | * | 12/1990 | Jost et al. ............................... | 702/101 |
| 5,656,800 | * | 8/1997 | Naito et al. ........................ | 177/25.18 |
| 5,665,941 | * | 9/1997 | Wehhofer et al. ................. | 177/25.13 |
| 5,936,206 | * | 8/1999 | Tajiri ................................ | 177/25.18 |
| 6,034,334 | * | 3/2000 | Nakamura et al. ............... | 177/25.18 |

OTHER PUBLICATIONS

*Feedback Control of Dynamic Systems*, Franklin et al. Addison–Wesley Publishing, Menlo Park, CA, pp. 568–569, May 1987.*

\* cited by examiner

Primary Examiner—Randy W. Gibson
(74) *Attorney, Agent, or Firm*—Staas & Halsey LLP

(57) ABSTRACT

In order to provide a combination weighing apparatus having an automatic filter adjusting capability which is effective to secure a weighing accuracy and also to adjust a filter characteristic of a digital filter having a short response time, the filter characteristic is automatically adjusted, based on a result of comparison of respective vibration components U of filtered weight signals FW1 to FWn with a permissible level US of the vibration components, so that the respective vibration components U of the filtered weight signals FW1 to FWn can attain a value approximating to the permissible level US, but not exceeding the permissible level US. In this way, by damping the vibration components U down to a value within the permissible level US, the weighing accuracy can be secured and, on the other hand, by damping the vibration components U down to a value approximating to the permissible level US, the filter characteristic can be obtained quickly in a short time.

23 Claims, 5 Drawing Sheets

WEIGHING APPARATUS HAVING AN AUTOMATIC FILTER ADJUSTING CAPABILITY

BACKGROUND OF THE INVENTION

1. Field of the Invention

The present invention generally relates to a weighing apparatus for measuring the weight of articles to be weighed and, more particularly, to the adjustment of a filter used in the weighing apparatus for removing a vibratory component contained in a weight signal.

2. Description of the Prior Art

Of the weighing apparatuses for measuring the weight of articles to be weighed, a combination weighing apparatus is known in which a combination calculation of respective weights of the articles to be weighed which have been supplied into a plurality of weighing hoppers is performed to provide a product having a predetermined weight. In this combination weighing apparatus, since the natural vibration peculiar to a weighing mechanism itself having an associated weighing hopper and an external vibration brought about mainly by vibration of the floor tend to be imposed as a vibration component on a weight signal outputted from each of the weighing hoppers, the use of a filter (a low-pass filter) in association with each of the weighing hoppers is necessitated to remove the vibration component to secure a weighing accuracy. In general, the frequency of the natural vibration is higher than that of the external vibration.

The filter of the kind described above is of a nature that once the filter constant determinative of the filter characteristics (cut-off frequency and/or damping characteristic) is determined, a filter response time can be fixed. In other words, if the capability of damping vibrations is increased by lowering the cut-off frequency, the response time can be increased, but if the capability of damping vibrations is lowered by increasing the cut-off frequency, the response time can be reduced. In view of this, the filter that can be employed in the weighing apparatus of the kind referred to above is required to be of a type having such a filter characteristic capable of damping the vibration component down to a level which will no longer affect the weighing accuracy and also having a short response time.

However, since the vibration component of the weight signal varies depending on weighing conditions of the weighing apparatus and/or conditions under which the weighing apparatus is installed, the solution hitherto taken is to install the weighing apparatus at a site of installation, to conduct a series of tests through trial and error with the filter characteristic being varied while articles to be weighed are actually supplied into the weighing apparatus and finally to select one of filters which has a vibration damping capability effective to secure the weighing accuracy and also having a short filter response time. Accordingly, an adjustment of the filter was a time-consuming work. Since the combination weighing apparatus requires the use of a plurality of weighing mechanisms, adjustment of the filter is required for each of the weighing mechanisms, resulting in extremely time-consuming and complicated procedures.

SUMMARY OF THE INVENTION

The present invention has been devised to substantially eliminate the above discussed problems and is intended to provide an improved weighing apparatus having an automatic filter adjusting capability, which is effective to secure a weighing accuracy and wherein the filter characteristic of the filter having a short response time can be adjusted in a short time.

In order to accomplish this object, one aspect of the present invention provides a weighing apparatus having an automatic filter adjusting capability which comprises a weighing cell for outputting a weight signal indicative of a weight of an article to be weighed which has been loaded thereon, a variable filter having a predetermined filter characteristic, for filtering the weight signal to provide a filtered weight signal, and a filter adjusting device for adjusting the filter characteristic of the variable filter to the predetermined filter characteristic. The filter adjusting device includes a vibration component detecting means for detecting a vibration component from the filtered weight signal, a level setting means for setting a permissible level of the vibration component of the filtered weight signal, a comparator for comparing the vibration component of the filtered weight signal with the permissible level, and a filter characteristic changing means operable based on a result of comparison performed by the comparator to adjust the filter characteristic of the variable filter to allow the vibration component to attain a magnitude approximating to the permissible level, but not exceeding the permissible level.

With this weighing apparatus, the filter characteristic is automatically adjusted, based on a result of comparison of the vibration component of the filtered weight signal with a permissible level of the vibration components, so that the vibration component of the filtered weight signal can attain a value approximating to the permissible level, but not exceeding the permissible level. In this way, by damping the vibration component down to a value within the permissible level, the weighing accuracy can be secured and, on the other hand, by damping the vibration component down to a value approximating to the permissible level, the filter characteristic in which the response time is reduced as short as possible can be obtained quickly in a short time.

The present invention according to a second aspect thereof provides a combination weighing apparatus having an automatic filter adjusting capability, which comprises a plurality of weighing cells for outputting respective weight signals indicative of weights of articles to be weighed which have been loaded thereon, a variable filter having a predetermined filter characteristic, for filtering the weight signals to provide corresponding filtered weight signals, a combination calculating means for selecting a combination of the articles to be weighed based on the respective filtered weight signals outputted from the variable filter to thereby calculate the combination which is approximating to a target value within a predetermined allowance, a filter adjusting device for adjusting the filter characteristic of the variable filter to the predetermined filter characteristic. The filter adjusting device used therein includes a vibration component detecting means for detecting a vibration component from each of the filtered weight signals, a level setting means for setting a permissible level of the vibration component of each of the filtered weight signals, a comparator for comparing the vibration component of each of the filtered weight signals with the permissible level, and a filter characteristic changing means operable based on a result of comparison performed by the comparator to adjust the filter characteristic of the variable filter to allow the vibration component to attain a magnitude approximating to the permissible level, but not exceeding the permissible level.

With the combination weighing apparatus according to the second aspect of the present invention, the filter characteristic is automatically adjusted, based on a result of comparison of respective vibration components of filtered weight signals with a permissible level of the vibration components, so that the respective vibration components of the filtered weight signals can attain a value approximating to the permissible level, but not exceeding the permissible level. In this way, by damping the vibration components down to a value within the permissible level, the weighing accuracy can be secured and, on the other hand, by damping the vibration components down to a value approximating to the permissible level, the filter characteristic in which the response time is reduced as short as possible can be obtained quickly in a short time.

The present invention furthermore provides, in accordance with a third aspect thereof, a combination weighing apparatus having an automatic filter adjusting capability, which comprises a plurality of weighing cells for outputting respective weight signals indicative of weights of articles to be weighed which have been loaded thereon, a plurality of variable filters each having a predetermined filter characteristic, for filtering the weight signals to provide corresponding filtered weight signals, said variable filters being divided into one or more groups, a combination calculating means for selecting a combination of the articles to be weighed based on the respective filtered weight signals outputted from the respective variable filters to thereby calculate the combination which is approximating to a target value within a predetermined allowance, a filter adjusting device for adjusting the filter characteristic of each of the variable filters to the predetermined filter characteristic. The filter adjusting device includes a vibration component detecting means for detecting a vibration component from the filtered weight signal outputted from one or more of the variable filters of each group, a level setting means for setting a permissible level of the vibration component of the filtered weight signal, a comparator for comparing the detected vibration component of the filtered weight signals with the permissible level, and a filter characteristic changing means operable based on a result of comparison performed by the comparator to adjust the respective filter characteristics of all of the variable filters of each group to the same filter characteristic to allow the vibration component to attain a magnitude approximating to the permissible level, but not exceeding the permissible level.

With the combination weighing apparatus according to the third aspect of the present invention, only some of the filtered weight signals within the group are used to adjust the filter characteristics of all of the variable filters of such group and, therefore, adjustment of the variable filters can be facilitated while the filter adjusting device can have a simplified structure.

Preferably, the filter characteristic changing means may be so designed as progressively change from the filter characteristic in which a capability of damping vibration is lowest with the shortest response time to the filter characteristic in which the capability of damping the vibration is highest with the longest response time and then to set the filter characteristic exhibited when the vibration component falls within the permissible level.

Alternatively, the filter characteristic changing means may be so designed as to progressively change from the filter characteristic in which a capability of damping vibration is highest with the longest response time to the filter characteristic in which the capability of damping the vibration is lowest with the shortest response time and then to set the filter characteristic exhibited immediately before the vibration component has exceeded the permissible level.

Also, the filter characteristic changing means can be used to adjust the respective filter characteristics of the variable filters to the same filter characteristic. In other words, based on a result of comparison performed by the comparator, all of the variable filters can be adjusted to the same filter characteristic to thereby allow any one of the vibration components to be of a value approximating to the permissible level, but not exceeding the permissible level. Even in this case, adjustment of the variable filters can be facilitated accompanying a simplification in structure of the filter adjusting device.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Some preferred embodiments of the present invention will now be described with reference to the accompanying drawings.

Figure 1:
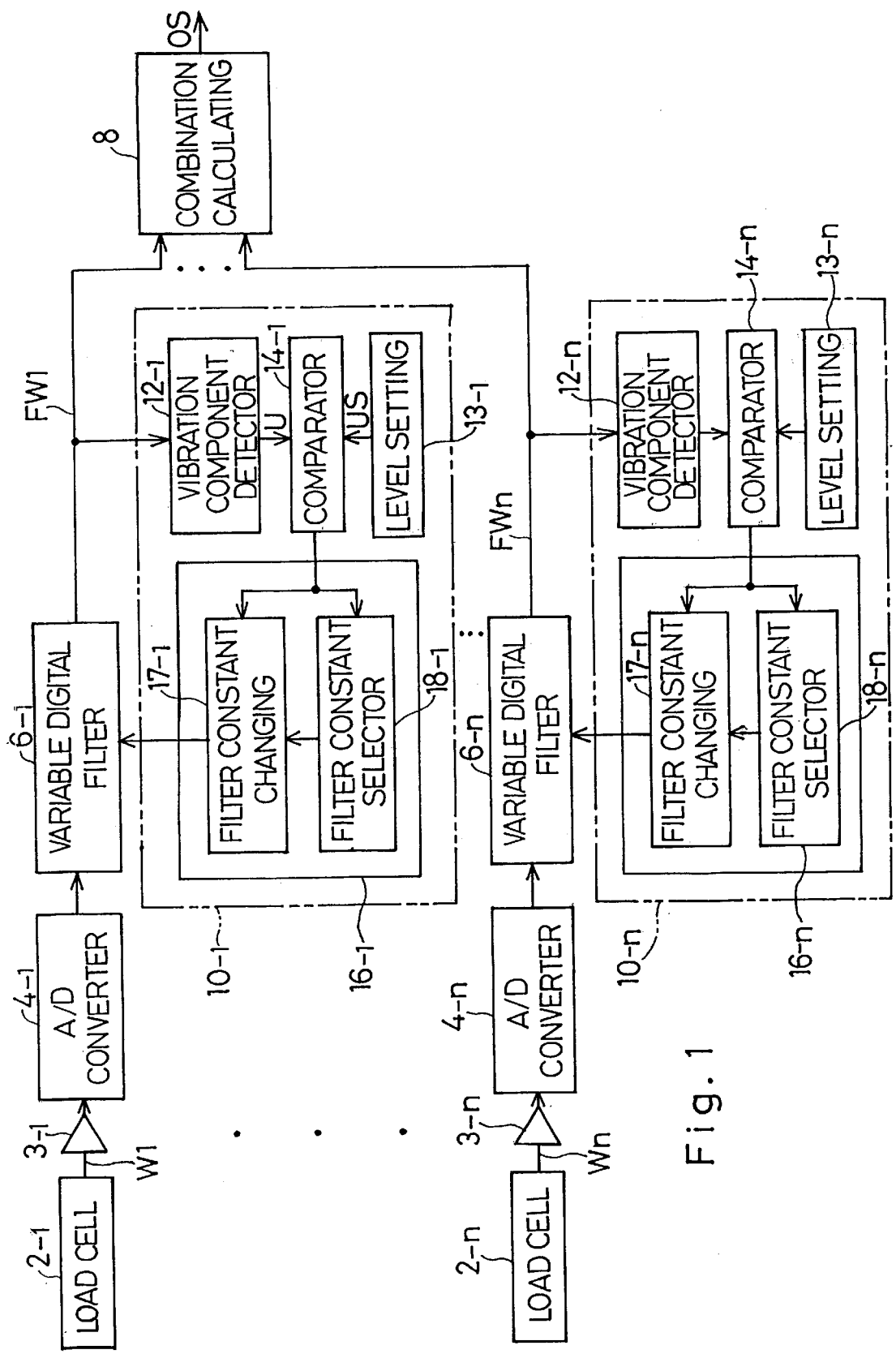
FIG. 1 is a circuit block diagram showing a combination weighing apparatus having an automatic filter adjusting capability according to a first preferred embodiment of the present invention.
Figure 2:
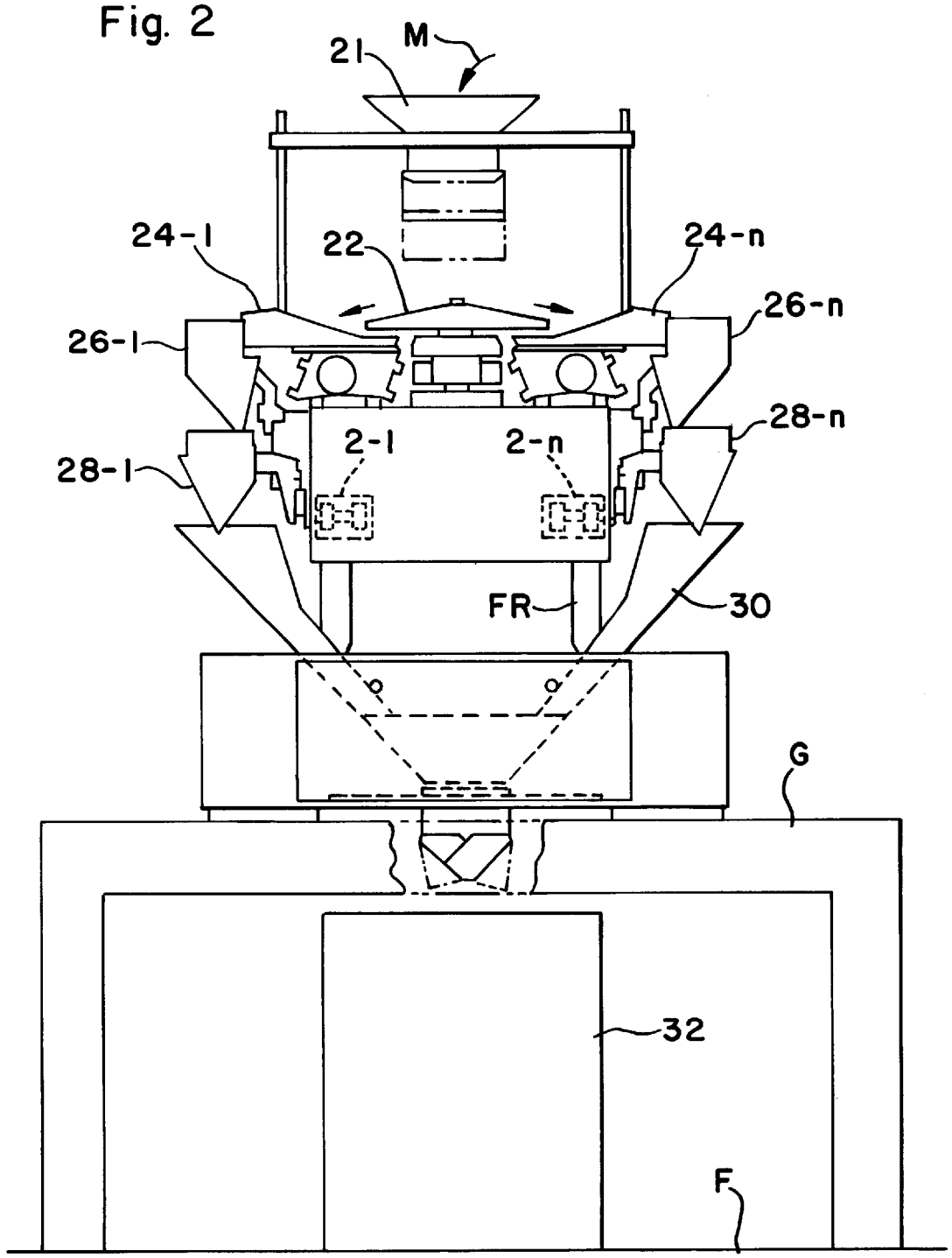
FIG. 2 is a schematic side elevational view showing the combination weighing apparatus.

Referring first to FIG. 1, there is shown a combination weighing apparatus having an automatic filter adjusting capability according to the first preferred embodiment of the present invention. The combination weighing apparatus shown therein comprises a plurality of weighing cells (load cells) 2-1, 2-2, 2-3, . . . 2-(n-1) and 2-n for measuring respective weights of articles to be weighed that have been supplied into a plurality of weighing hoppers 28-1, 28-2, 28-3, . . . 28-(n-1) and 28-n (See FIG. 2) and also for outputting weight signals W1, W2, W3, . . . W(n-1) and Wn indicative of the respective weights of the articles to be weighed; amplifiers 3-1, 3-2, 3-3, . . . 3-(n-1) and 3-n for amplifying the respective weight signals W1, W2, W3, . . . W(n-1) and Wn; analog-to-digital (A/D) converters 4-1, 4-2, 4-2, . . . 4-(n-1) and 4-n for sampling the amplified weight signals W1, W2, W3, . . . W(n-1) and Wn at a predetermined sampling frequency, respectively, and converting them into respective digital weight signals; variable digital filters 6-1, 6-2, 6-2, . . . 6-(n-1) and 6-n having respective predetermined filter characteristics and operable to filter the associated digital weight signals W1, W2, W3, . . . W(n-1) and Wn to output corresponding filtered weight signals FW1, FW2, FW3, . . . FW(n-1) and FWn; and a combination calculating means 8 for selectively combining the filtered weight signals FW1 to FWn, for calculating a combination of those filtered weight signals FW1 to FWn that is approximate to a target value within a predetermined allowance range and for outputting OPEN signals OS for opening respective gates of some or all of the weighing hoppers 28-1, 28-2, 28-3, 28-(n-1) and 28-n that have been selected.

A schematic side elevational view of the combination weighing apparatus described above is shown in FIG. 2. In this combination weighing apparatus, the articles M to be weighed are supplied from a supply conveyor (not shown) onto a dispensing table 22 through a supply chute 21. The articles M to be weighed which have been supplied onto the dispensing table 22 are dispensed radially outwardly of the dispensing table 22 and are then supplied into pool hoppers 26-2, 26-2, 26-3, ... 26-(n-1) and 26-n through associated radial troughs 24-1, 24-2, 24-3, ... 24-(n-1) and 24-n where the articles M to be weighed are pooled temporarily before they are eventually supplied into the weighing hoppers 28-1 to 28-n. The articles M to be weighed so supplied into the weighing hoppers 28-1 to 28-n are weighed by the weighing cells (load cells) 2-1 to 2-n each appended to the corresponding weighing hopper 28-1 to 28-n and are combination-calculated based on the filtered weight signals FW1 to FWn. After the combination calculation of the respective weights of the articles M, some or all of the gates of the weighing hoppers 28-1 to 28-n are opened in response to the associated OPEN signals OS to allow the articles M to be discharged into corresponding collecting chutes 30. The articles M which have been weighed and discharged into the collecting chutes 30 are subsequently packaged by a packaging machine 32 to provide a bagged product of a weight equal to or substantially equal to the target weight.

As shown in FIG. 1, the combination weighing apparatus shown therein also comprises filter adjusting devices 10-1, 10-2, 10-3, ... 10-(n-1) and 10-n each operable to adjust the filter characteristic of the corresponding variable digital filters 6-1 to 6-n to set it to a predetermined filter characteristic.

Each of the filter adjusting devices 10-1 to 10-n includes a vibration component detecting means 12-1, 12-2, 12-3, ... , 12-(n-1) to 12-n for detecting a vibration component U from the respective filtered weight signal FW1 to FWn. This vibration component detecting means 12-1 to 12-n of each of the filter adjusting devices 10-1 to 10-n is, after the respective weight signal W1 to Wn have been repeatedly sampled by the associated A/D converter 4-1 to 4-n a predetermined time (fixed time) subsequent to the corresponding weighing hopper 28-1 to 18-n having been filled with the articles M to be weighed, operable to detect the vibration component U in terms of the difference between maximum and minimum values of the respective filtered weight signal FW1 to FWn obtained at that time.

Each of the filter adjusting devices 10-1 to 10-n also includes a level setting means 13-1, 13-2, 13-3, ... 13-(n-1) and 13-n for setting a permissible level US of the vibration component of the respective filtered weight signal FW1 to FWn, a comparator 14-1, 14-2, 14-3, ... 14-(n-1) and 14-n for comparing the vibration component U of the respective filtered weight signal FW1 to FWn with the associated permissible level US, and a filter characteristic changing and setting means 16-1, 16-2, 16-3, ... 16-(n- 1) and 16-n for adjusting the filter characteristic of the associated variable digital filter 6-1 to 6-n so as to allow the vibration component U to have a relatively large value approximate to the permissible level US, but not exceeding the permissible level US.

Each of the filter characteristic changing and setting means 16-1 to 16-n includes a filter constant changing means 17-1, 17-2, 17-3, ... 17-(n-1) and 17-n and a filter constant selecting means 18-1, 18-2, 18-3, ... 18-(n-1) and 18-n. The filter constant changing means 17-1 to 17-n is operable to change the filter constant of the corresponding variable digital filter 6-1 to 6-n to progressively vary step-by-step (step down) the filter characteristic from the highest cut-off frequency (the filter characteristic of the lowest vibration damping capability and the shortest response time) down to the lower cut-off frequency (the filter characteristic of the highest vibration damping capability and the longest response time). Change of the filter constant is, where the filtering is carried out by, for example, a known thinning calculation, accomplished by changing the number of thinning. If the number of thinning is small, a strong filter characteristic with a low cut-off frequency can be obtained. The number of steps through which the filter characteristic is changed is determined in consideration of design parameters and/or other conditions of the corresponding digital filter. Each of the filter constant selecting means 18-1 to 18-n is operable to select a filter constant which would render the vibration component U of the corresponding filtered weight signal FW1 to FWn to fall within the permissible level US for the first time, that is, which would cause the vibration component U of the corresponding filtered weight signal FW1 to FWn to attain a magnitude most approximating to the permissible level US, but not exceeding the permissible level US, to thereby set the corresponding variable digital filter 6-1 to 6-n to such filter characteristic.

The operation of the combination weighing apparatus of the circuit design shown in FIG. 1 will now be described with reference to the flowchart shown in FIGS. 3.

The combination weighing apparatus shown in FIG. 1 has an automatic adjusting mode in which the filter adjusting devices 10-1 to 10-n are activated according to change in weighing conditions and/or conditions under which the combination weighing apparatus is installed, to thereby accomplish an automatic adjustment of the variable digital filters. This automatic adjusting mode can be set on by manipulation of a mode switch (not shown). Adjustment is carried out for each of the variable digital filters 6-1 to 6-n associated with the respective weighing cells 2-1 to 2-n, and it is assumed that this adjustment will start with the variable digital filter 6-1.

Assuming that the automatic adjusting mode is set on, the filter adjusting device 10-1 is activated at step S1. The variable digital filter 6-1 has the filter characteristic set at step S2 to an initial value which is the filter constant of the highest cut-off frequency (the lowest vibration damping capability and the shortest response time).

The articles M to be weighed are subsequently supplied into the associated weighing hopper 28-1 at step S3 to cause the corresponding weighing mechanism to generate a natural vibration. After passage of a response time of the associated variable digital filter 6-1 that is determined by the selected filter constant, the associated comparator 14-1 compares the vibration component U of the filtered weight signal FW1, detected by the corresponding vibration component detecting means 12-1, with the permissible level US set by the corresponding level setting means 13-1 at step S4. It is to be noted that the steps S3 and S4 may be executed a plurality of times so that the average value of the vibration components U can be compared.

If as a result of the comparison at step S4 it is determined at step S5 that damping of the vibration is insufficient and the vibration component U is in excess of the permissible level, the filter characteristic is stepped at step S6 by the corresponding filter constant changing means 17-1 down to the filter characteristic of a lower cut-off frequency (a higher vibration damping capability and a longer response time) before the program flow returns to step S3. In such case, until the vibration component U attains a value within the permissible level US, the filter characteristic is progressively changed step-by-step, that is, stepped down by repeating the program flow of steps S3 to S6.

Where the vibration component U does not attain a value within the permissible level US even though the cut-off frequency of each of the variable digital filter 6-1 to 6-n is set to the lowest value (with the longest response time), a warning is given to an operator calling his attention to the fact that with such variable digital filter no required accuracy can be attained.

If at step S5 it is determined that the vibration component U of the filtered weight signal FW1 has fallen within the permissible level US for the first time, the filter constant selecting means 18-1 is activated so that the filter characteristic at that tie can be employed at step S7. In this way, the variable digital filter 6-1 is set to the filter characteristic permitting the vibration component U to be of a value approximating to the permissible level US, but not exceeding the permissible level US.

With respect to each of the remaining variable digital filters 6-2 to 6-n, the filter characteristic can be automatically adjusted in a manner similar to that described above in connection with the variable digital filter 6-1 by executing the program flow from step S1 to S7. The automatic adjusting mode completes when the filter characteristic of the last variable digital filter 6-n has been adjusted, followed by start of combination weighing performed by the combination weighing apparatus.

Thus, in the combination weighing apparatus, the filter characteristic of each of the variable digital filters can be so selected that the weighing accuracy can be secured by damping the vibration component U to a value within the permissible level US and the response time is reduced to a value as short as possible by damping the vibration component U to a magnitude most approximating to the permissible level US. Since this series of adjustment is performed automatically, the filter adjustment can be accomplished in a short time.

It is to be noted that if the weighing conditions of the weighing mechanisms and/or the conditions under which the combination weighing apparatus is installed remain the same, by determining the filter characteristic of one of the variable digital filters 6-1 to 6-n, for example, that of the variable digital filter 6-1, each of the remaining variable digital filters 6-2 to 6-n may have its filter characteristic adjusted to exhibit the same filter characteristic as the variable digital filter 6-1.

In the foregoing first embodiment of the present invention the natural vibration of each of the weighing mechanisms is unknown. However, where the natural vibration of the respective weighing mechanism is known, the operation to supply the articles M to be weighed into the corresponding weighing hoppers 28-1 to 28-n to cause the associated weighing mechanism to generate the natural vibration at step S3 shown in FIG. 3 may be dispensed with so that only the vibration component brought about by an external vibration can be detected by the associated vibration component detecting means 12-1 to 12-n. Also, as the initial value at step S2 shown in FIG. 3, the frequency of the known natural vibration may be employed as a reference to the cut-off frequency. In general, however, since the frequency of the natural vibration is higher than the frequency of the external vibration, the cut-off frequency at which the external vibration can be attenuated is nevertheless effective to attenuate the natural vibration. Furthermore, since the filter characteristic having a cut-off frequency which is lower (with higher attenuating capability) than the frequency of the known natural vibration is used as the initial value, as compared with FIG. 3 in which the initial value is selected by stepping down from the highest cut-off frequency, the number of the steps (S3 to S6) to be repeated can be reduced, permitting the filter adjustment to be accomplished in a shorter time.

In such case, if the respective timings at which the vibration components are detected by the associated vibration component detecting means 12-1 to 12-n are set to the timing at which vibration resulting from the articles M to be weighed that are supplied into the weighing hoppers 28-1 to 28-n is settled down, only the vibration component brought about by the external vibration can be detected without being adversely influenced by the natural vibration regardless of whether the weighing hoppers 28-1 to 28-n in which the articles M to be subsequently weighed are supplied are employed or whether the weighing hoppers 28-1 to 28-n failing to discharge the articles M which have been weighed are employed.

It is to be noted that in a manner substantially reverse to the foregoing first embodiment, the filter constant of the lowest cut-off frequency (the highest vibration damping capability and the longest response time) may be selected as an initial value of the filter characteristic, and the selected cutoff frequency may then be progressively changed step-by-step (i.e., stepped up) to a higher value (the lower vibration damping capability and the shorter response time). In such case, the filter characteristic which is within the permissible level one step preceding the filter characteristic that has exceeded the permissible level US for the first time is employed by the filter constant selecting means 18-1 to 18-n.

Hereinafter, a second embodiment of the present invention in which only one analog-to-digital converter is employed for the plural variable digital filters will be discussed with particular reference to FIG. 4.

Figure 4:
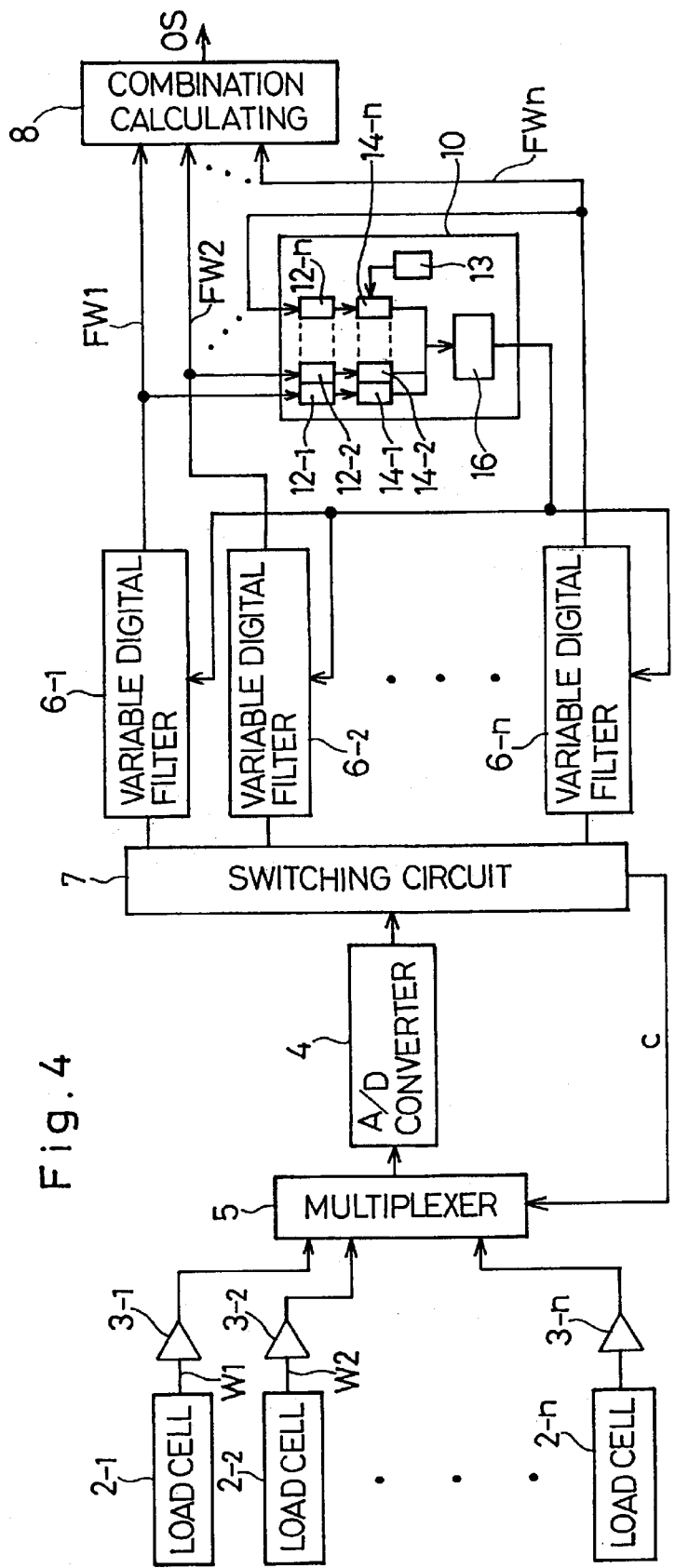
FIG. 4 is a circuit block diagram showing the combination calculating apparatus having the automatic filter adjusting capability according to a second preferred embodiment of the present invention.

Referring now to FIG. 4, in the combination weighing apparatus having the automatic filter adjusting capability according to the second preferred embodiment of the present invention, the weight signals W1 to Wn outputted from the respective weighing cells (load cells) 2-1 to 2-n and indicative of the respective weights of the articles M to be weighed are, after having been amplified by the associated amplifier 3-1 to 3-n, supplied to a multiplexer 5. The weight signals W1 to Wn are selected one at a time by the multiplexer 5, that is driven in response to a switching signal c supplied thereto from a switching circuit 7, and are then supplied to a single analog-to-digital (A/D) converter 4 one by one for conversion into corresponding digital weight signals. The digital weight signals emerging successively from the A/D converter 4 are in turn supplied to the switching circuit 7. Thereafter, as is the case with the previously described first embodiment, the digital weight signals W1 to Wn emerging from the switching circuit 7 are filtered by the associated variable digital filters 6-1 to 6-n each having a predetermined filter characteristic preset thereto so as to provide the associated filtered weight signals FW1 to FWn. The filtered weight signals FW1 to FWn are subsequently combined by the combination calculating means 8 for calculation of the combination of those filtered weight signals FW1 to FWn to select a combined value approximate to the target value within the predetermined allowance range, to thereby output the OPEN signals OS which are in turn supplied to a combination of the selected weighing hoppers 28-1 to 28-n to open the corresponding gates of those selected weighing hoppers 28-1 to 28-n to allow the articles M to be discharged into the associated collecting chutes 30.

Each of the variable digital filters 6-1 to 6-n employed in the combination weighing apparatus according to the second embodiment of the present invention is in the form of a single variable digital filter 6 that functions as a plurality of parallel-connected filters on a time-sharing technique. Also, a single filter adjusting device 10 is employed that is operable to adjust the respective filter characteristics of the variable digital filters 6-1 to 6-n to the same filter characteristic.

When the combination weighing apparatus according to the second embodiment is set in the adjusting mode, the respective filter characteristics of the variable digital filters 6-1 to 6-n are changed all at a time to accomplish the filter adjustment. In other words, when the filter constant of the lowest cut-off frequency is selected as an initial value of the filter characteristic and the cut-off frequency is progressively changed step-by-step (i.e., stepped up) to a higher value, the respective vibration components contained in the associated outputs from the variable digital filters 6-1 to 6-n are detected by the corresponding vibration component detecting means 12-1 to 12-n in the filter adjusting device 10 and the detected vibration components are compared by the respective comparators 14-1 to 14-n with the permissible level US set by a single level setting means 13. Then the filter characteristic within the permissible level US which is one step preceding the filter characteristic at which one of the n vibration components has exceeded the permissible level US for the first time can be employed as a common filter characteristic. If at this time all of the variable digital filters 6-1 to 6-n are set to this common filter characteristic, it is clear that the respective filter characteristics of the variable digital filters 6-1 to 6-n fall within the permissible level US.

Conversely, if the filter characteristic is progressively changed step-by-step, that is, stepped down from that with the highest cut-off frequency to the lower cut-off frequency, the filter characteristic exhibited at the time all of the variable digital filters 6-1 to 6-n have come to exhibit the respective filter characteristics within the permissible level US is employed. In this way, even where the common A/D converter is employed, the filter characteristic for the variable digital filters 6-1 to 6-n having a short response time while the weighing accuracy is maintained can be adjusted in a short time.

Figure 5:
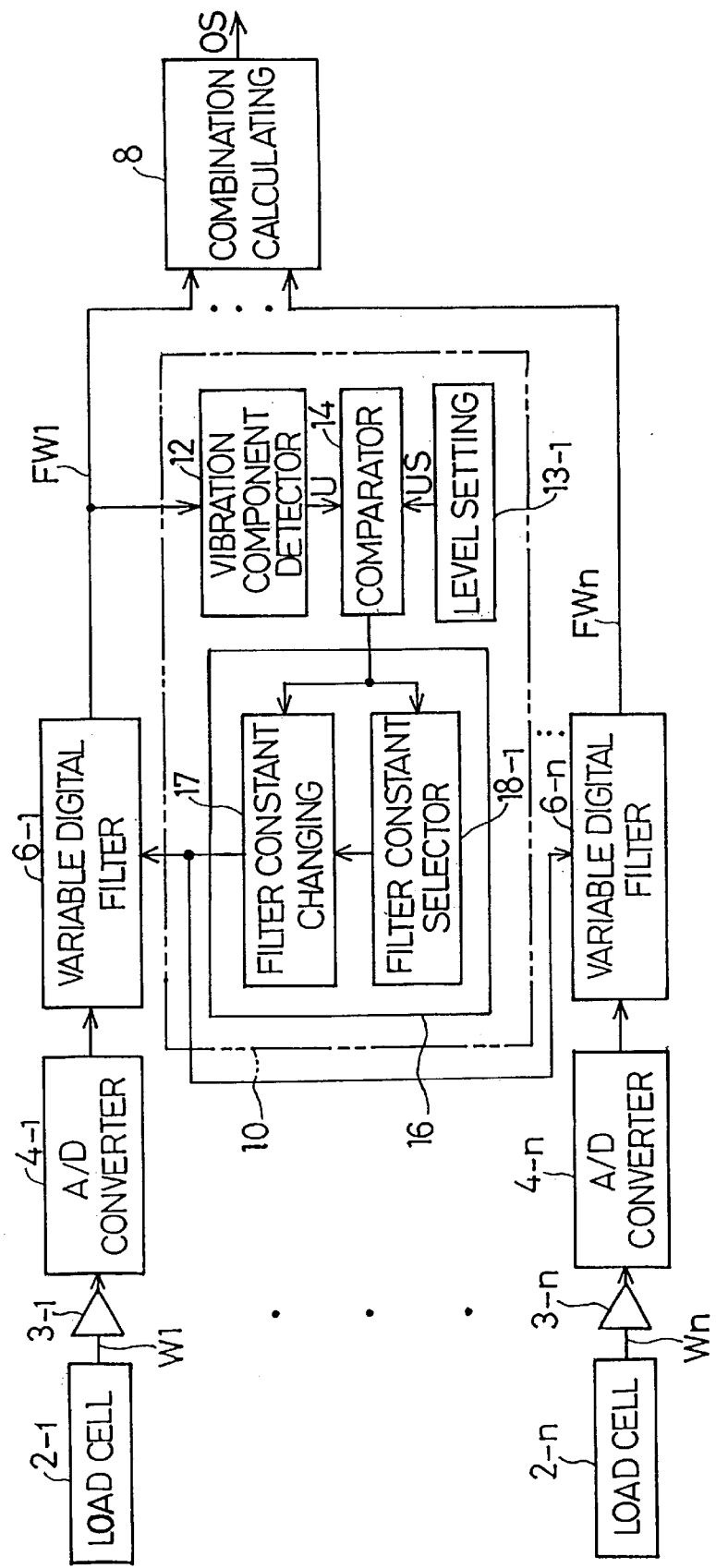
FIG. 5 is a circuit block diagram showing the combination weighing apparatus having an automatic filter adjusting capability according to the third preferred embodiment of the present invention.

A third embodiment of the present invention shown in FIG. 5 is applicable where the weighing and installation conditions of the respective weighing mechanisms remain substantially the same. The combination weighing apparatus according to this third embodiment of the present invention is so designed and so configured that during the adjusting mode, based on the weight signal outputted from only some, for example, only one of the weighing cells, all of the filter characteristics may be fixed and all of the variable digital filters 6-1 to 6-n may then be adjusted to such filter characteristics. By way of example, based on the filtered weight signal FW1 outputted from the variable digital filter 6-1 coupled with the weighing cell 2-1, the filter characteristic is adjusted step-by-step in a manner similar to that described in connection with the first embodiment of the present invention to determine the filter characteristic with which the filtered weight signal FW1 falling within the permissible level US can be obtained, and the remaining variable digital filters 6-2 to 6-n are then adjusted to such determined filter characteristic. In this way, the filter characteristic for the variable digital filters 6-1 to 6-n having a short response time while the weighing accuracy is maintained can be adjusted in a short time.

Unlike this embodiment, arrangement may be made that based on the filtered weight signals supplied respectively from two or more of the variable digital filters all of the variable digital filters may be adjusted to the same filter characteristic so that one of the vibration components can be of a value approximating to the permissible level, but not exceeding the permissible level. Also, since a plurality of weighing heads each including the weighing hopper, the weighing cell associated with the respective weighing hopper and the variable digital filter are employed, arrangement may be contemplated in which the weighing heads are divided into a plurality of groups and, based on the filtered weight signal supplied from a portion of, for example, one variable digital filter for each group, all of the variable digital filters of such group can be adjusted to the same filter characteristic by the use of the technique described hereinbefore.

Although in the foregoing embodiment the variable filters are employed in the form of a variable digital filter, the use of a variable analog filter may be contemplated within the spirit of the present invention.

Figure 3:
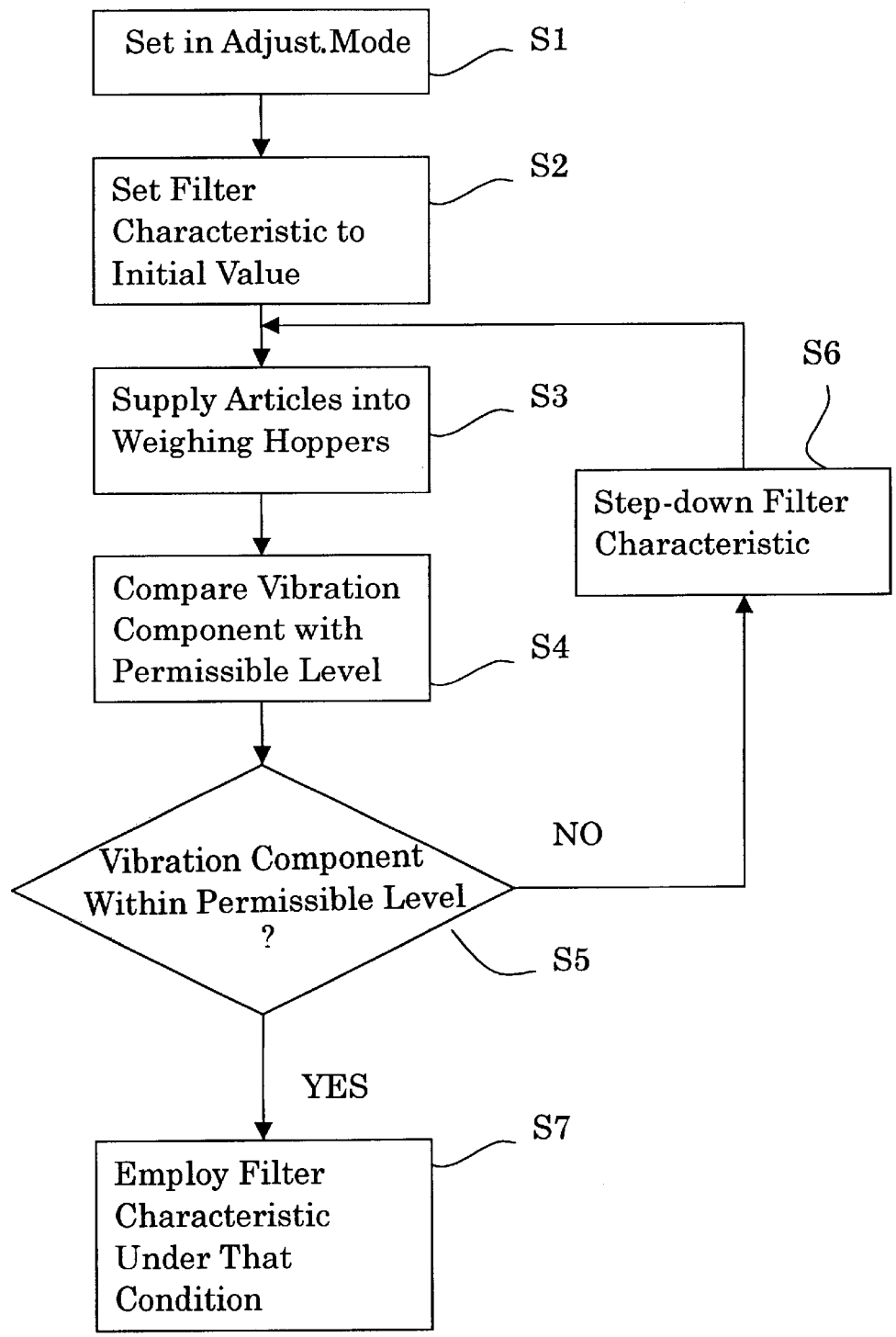
FIG. 3 is a flowchart showing the sequence of operation of the combination weighing apparatus.

In addition, although the present invention makes use of the automatic adjusting mode, other than the normal weighing mode, for adjusting the respective filter characteristics of the variable digital filters 6-1 to 6-n, the use of the automatic adjusting mode is not always essential and the automatic adjustment of the filter characteristic such as represented by the flow of step S2 to S7 shown in FIG. 3 can be accomplished by the utilization of weighing data obtained from some of the weighing hoppers 28-1 to 28-n from which the articles M have not been discharged during the operation of the combination weighing apparatus.

It is to be noted that the present invention is applicable not only to the combination weighing apparatus herein discussed, but also to an automatic weighing apparatus including a single weighing table on which articles to be weighed are placed, and a weighing cell for measuring the load on the weighing table and for subsequently outputting a weight signal indicative of the weight of the articles to be weighed.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A weighing apparatus having an automatic filter adjusting capability, comprising:

a weighing cell outputting a weight signal indicative of a weight of an article to be weighed which has been loaded thereon;

a variable filter having a predetermined filter characteristic, filtering the weight signal to provide a filtered weight signal; and a filter adjusting device adjusting the filter characteristic of the variable filter to the predetermined filter characteristic, said filter adjusting device including
a vibration component detecting device detecting a vibration component from the filtered weight signal,
a level setting device setting a permissible level of the vibration component of the filtered weight signal,
a comparator comparing the vibration component of the filtered weight signal with the permissible level, and
a filter characteristic changing device operable based on a result of comparison performed by the comparator to adjust the filter characteristic of the variable filter to allow the vibration component to attain a magnitude approximating to the permissible level, but not exceeding the permissible level, wherein said filter characteristic changing device is operable to progressively change from the filter characteristic in which a capability of damping vibration is lowest with the shortest response time to the filter characteristic in which the capability of damping the vibration is highest with the longest response time and then to set the filter characteristic exhibited when the vibration component falls within the permissible level.

2. A combination weighing apparatus having an automatic filter adjusting capability, comprising:
a plurality of weighing cells outputting respective weight signals indicative of weights of articles to be weighed which have been loaded thereon;
a variable filter having a predetermined filter characteristic, filtering the weight signals to provide corresponding filtered weight signals;
a combination calculating device selecting a combination of the articles to be weighed based on the respective filtered weight signals outputted from the variable filter to thereby calculate the combination which is approximating to a target value within a predetermined allowance;
a filter adjusting device adjusting the filter characteristic of the variable filter to the predetermined filter characteristic, said filter adjusting device including
a vibration component detecting device detecting a vibration component from each of the filtered weight signals,
a level setting device setting a permissible level of the vibration component of each of the filtered weight signals,
a comparator comparing the vibration component of each of the filtered weight signals with the permissible level, and
a filter characteristic changing device operable based on a result of comparison performed by the comparator to adjust the filter characteristic of the variable filter to allow the vibration component to attain a magnitude approximating to the permissible level, but not exceeding the permissible level, wherein said filter characteristic changing device is operable to progressively change from the filter characteristic in which a capability of damping vibration is lowest with the shortest response time to the filter characteristic in which the capability of damping the vibration is highest with the longest response time and then to set the filter characteristic exhibited when the vibration component falls within the permissible level.

3. A combination weighing apparatus having an automatic filter adjusting capability, comprising:

a plurality of weighing cells outputting respective weight signals indicative of weights of articles to be weighed which have been loaded thereon;
a plurality of variable filters each having a predetermined filter characteristic, filtering the weight signals to provide corresponding filtered weight signals, said variable filters being divided into one or more groups;
a combination calculating device selecting a combination of the articles to be weighed based on the respective filtered weight signals outputted from the respective variable filters to thereby calculate the combination which is approximating to a target value within a predetermined allowance;
a filter adjusting device adjusting the filter characteristic of each of the variable filters to the predetermined filter characteristic, said filter adjusting device including
a vibration component detecting device detecting a vibration component from the filtered weight signal outputted from one or more of the variable filters of each group,
a level setting device setting a permissible level of the vibration component of the filtered weight signal,
a comparator comparing the detected vibration component of the filtered weight signals with the permissible level, and
a filter characteristic changing device operable based on a result of comparison performed by the comparator to adjust the respective filter characteristics of all of the variable filters of each group to the same filter characteristic to allow the vibration component to attain a magnitude approximating to the permissible level, but not exceeding the permissible level, wherein said filter characteristic changing device is operable to progressively change from the filter characteristic in which a capability of damping vibration is lowest with the shortest response time to the filter characteristic in which the capability of damping the vibration is highest with the longest response time and then to set the filter characteristic exhibited when the vibration component falls within the permissible level.

4. A weighing apparatus having an automatic filter adjusting capability, comprising:
a weighing cell outputting a weight signal indicative of a weight of an article to be weighed which has been loaded thereon;
a variable filter having a predetermined filter characteristic, for filtering the weight signal to provide a filtered weight signal; and
a filter adjusting device adjusting the filter characteristic of the variable filter to the predetermined filter characteristic, said filter adjusting device including
a vibration component detecting device detecting a vibration component from the filtered weight signal,
a level setting device setting a permissible level of the vibration component of the filtered weight signal,
a comparator comparing the vibration component of the filtered weight signal with the permissible level, and
a filter characteristic changing device operable based on a result of comparison performed by the comparator to adjust the filter characteristic of the variable filter to allow the vibration component to attain a magnitude approximating to the permissible level, but not exceeding the permissible level, wherein said filter characteristic changing device is operable to progressively change from the filter characteristic in which a capability of damping vibration is highest with the longest response time to the filter characteristic in which the capability of damping the vibration is lowest with the shortest response time and then to set the filter characteristic exhibited immediately before the vibration component has exceeded the permissible level.

5. A combination weighing apparatus having an automatic filter adjusting capability, comprising:

a plurality of weighing cells outputting respective weight signals indicative of weights of articles to be weighed which have been loaded thereon;

a variable filter having a predetermined filter characteristic, filtering the weight signals to provide corresponding filtered weight signals;

a combination calculating device selecting a combination of the articles to be weighed based on the respective filtered weight signals outputted from the variable filter to thereby calculate the combination which is approximating to a target value within a predetermined allowance;

a filter adjusting device adjusting the filter characteristic of the variable filter to the predetermined filter characteristic, said filter adjusting device including a vibration component detecting device detecting a vibration component from each of the filtered weight signals, a level setting device setting a permissible level of the vibration component of each of the filtered weight signals, a comparator comparing the vibration component of each of the filtered weight signals with the permissible level, and a filter characteristic changing device operable based on a result of comparison performed by the comparator to adjust the filter characteristic of the variable filter to allow the vibration component to attain a magnitude approximating to the permissible level, but not exceeding the permissible level, wherein said filter characteristic changing device is operable to progressively change from the filter characteristic in which a capability of damping vibration is highest with the longest response time to the filter characteristic in which the capability of damping the vibration is lowest with the shortest response time and then to set the filter characteristic exhibited immediately before the vibration component has exceeded the permissible level.

6. A combination weighing apparatus having an automatic filter adjusting capability, comprising:

a plurality of weighing cells outputting respective weight signals indicative of weights of articles to be weighed which have been loaded thereon;

a plurality of variable filters each having a predetermined filter characteristic, filtering the weight signals to provide corresponding filtered weight signals, said variable filters being divided into one or more groups;

a combination calculating device selecting a combination of the articles to be weighed based on the respective filtered weight signals outputted from the respective variable filters to thereby calculate the combination which is approximating to a target value within a predetermined allowance;

a filter adjusting device adjusting the filter characteristic of each of the variable filters to the predetermined filter characteristic, said filter adjusting device including a vibration component detecting device detecting a vibration component from the filtered weight signal outputted from one or more of the variable filters of each group, a level setting device setting a permissible level of the vibration component of the filtered weight signal, a comparator comparing the detected vibration component of the filtered weight signals with the permissible level, and a filter characteristic changing device operable based on a result of comparison performed by the comparator to adjust the respective filter characteristics of all of the variable filters of each group to the same filter characteristic to allow the vibration component to attain a magnitude approximating to the permissible level, but not exceeding the permissible level, wherein said filter characteristic changing device is operable to progressively change from the filter characteristic in which a capability of damping vibration is highest with the longest response time to the filter characteristic in which the capability of damping the vibration is lowest with the shortest response time and then to set the filter characteristic exhibited immediately before the vibration component has exceeded the permissible level.

7. A combination weighing apparatus having an automatic filter adjusting capability, comprising:

a plurality of weighing cells outputting respective weight signals indicative of weights of articles to be weighed which have been loaded thereon;

a variable filter having a predetermined filter characteristic, filtering the weight signals to provide corresponding filtered weight signals;

a combination calculating device selecting a combination of the articles to be weighed based on the respective filtered weight signals outputted from the variable filter to thereby calculate the combination which is approximating to a target value within a predetermined allowance;

a filter adjusting device adjusting the filter characteristic of the variable filter to the predetermined filter characteristic, said filter adjusting device including a vibration component detecting device detecting a vibration component from each of the filtered weight signals, a level setting device setting a permissible level of the vibration component of each of the filtered weight signals, a comparator comparing the vibration component of each of the filtered weight signals with the permissible level, and a filter characteristic changing device operable based on a result of comparison performed by the comparator to adjust the filter characteristic of the variable filter to allow the vibration component to attain a magnitude approximating to the permissible level, but not exceeding the permissible level, wherein said filter characteristic changing device is operable based on a result of comparison performed by the comparator to adjusts all of the variable filters to the same filter characteristic to thereby allow any one of the vibration components to be of a value approximating to the permissible level, but not exceeding the permissible level.

8. An apparatus comprising:

a weighing cell outputting a weight signal indicative of a weight of an article to be weighed which has been loaded thereon;

a filter having an adjustable filter characteristic, the filter filtering the weight signal in accordance with the filter characteristic to provide a filtered weight signal;

a vibration component detector detecting a vibration component from the filtered weight signal;

a comparator comparing the detected vibration component with a permissible level, to produce a comparison result; and a filter adjuster progressively adjusting the filter characteristic in accordance with the comparison result from a filter characteristic in which damping vibration is lowest with a shortest response time toward a filter characteristic in which damping vibration is highest with a longest response time, and setting the filter characteristic at a level where the vibration component attains a magnitude approximating to, but not exceeding, the permissible level.

9. An apparatus comprising:

a plurality of weighing cells, each weighing cell outputting a corresponding weight signal indicative of weight of articles loaded thereon; and a plurality of filter devices corresponding, respectively, to the plurality of weighing cells, each filter device comprising a filter having an adjustable filter characteristic, the filter filtering the weight signal of the corresponding weighing cell in accordance with the filter characteristic to provide a filtered weight signal, a vibration component detector detecting a vibration component from the filtered weight signal, a comparator comparing the detected vibration component with a permissible level, to produce a comparison result, and a filter adjuster progressively adjusting the filter characteristic in accordance with the comparison result from a filter characteristic in which damping vibration is lowest with a shortest response time toward a filter characteristic in which damping vibration is highest with a longest response time, and setting the filter characteristic at a level where the vibration component attains a magnitude approximating to, but not exceeding, the permissible level.

10. An apparatus as in claim 9, further comprising:

a processor selecting a combination of the weighed articles based on the filtered weight signals to thereby calculate a combination which is approximating to a target value within a predetermined allowance.

11. An apparatus comprising:

a plurality of weighing cells, each weighing cell outputting a corresponding weight signal indicative of weight of articles loaded thereon; and a plurality of filters corresponding, respectively, to the plurality of weighing cells, each filter having an adjustable filter characteristic and filtering the weight signal of the corresponding weighing cell in accordance with the filter characteristic to provide a filtered weight signal, a plurality of vibration component detectors corresponding, respectively, to the plurality of filters, each vibration component detector detecting a vibration component from the filtered weight signal of the corresponding filter, a plurality of comparators corresponding, respectively, to the plurality of vibration detectors, each comparator comparing the detected vibration component of the corresponding vibration detector with a permissible level, to produce a comparison result, and a filter adjuster progressively adjusting the filter characteristics of the plurality of filters in accordance with the comparison results from a filter characteristic in which damping vibration is lowest with a shortest response time toward a filter characteristic in which damping vibration is highest with a longest response time, and setting the filter characteristic of each filter to the same filter characteristic which is at a level where the vibration component of the filtered weight signal of each filter attains a magnitude approximating to, but not exceeding, the permissible level.

12. An apparatus as in claim 11, further comprising:

a processor selecting a combination of the weighed articles based on the filtered weight signals to thereby calculate a combination which is approximating to a target value within a predetermined allowance.

13. An apparatus comprising:

a weighing cell outputting a weight signal indicative of a weight of an article loaded thereon;

a filter having an adjustable filter characteristic, the filter filtering the weight signal in accordance with the filter characteristic to provide a filtered weight signal;

a vibration component detector detecting a vibration component from the filtered weight signal;

a comparator comparing the detected vibration component with a permissible level, to produce a comparison result; and a filter adjuster progressively adjusting the filter characteristic in accordance with the comparison result from a filter characteristic in which damping vibration is highest with the longest response time toward the filter characteristic in which damping vibration is lowest with the shortest response time, and setting the filter characteristic at a level exhibited immediately before the vibration component has exceeded the permissible level.

14. An apparatus comprising:

a plurality of weighing cells, each weighing cell outputting a corresponding weight signal indicative of weight of articles loaded thereon; and a plurality of filter devices corresponding, respectively, to the plurality of weighing cells, each filter device comprising a filter having an adjustable filter characteristic, the filter filtering the weight signal of the corresponding weighing cell in accordance with the filter characteristic to provide a filtered weight signal, a vibration component detector detecting a vibration component from the filtered weight signal, a comparator comparing the detected vibration component with a permissible level, to produce a comparison result, and a filter adjuster progressively adjusting the filter characteristic in accordance with the comparison result from a filter characteristic in which damping vibration is highest with the longest response time toward the filter characteristic in which damping vibration is lowest with the shortest response time, and setting the filter characteristic at a level exhibited immediately before the vibration component has exceeded the permissible level.

15. An apparatus as in claim 14, further comprising:

a processor selecting a combination of the weighed articles based on the filtered weight signals to thereby calculate a combination which is approximating to a target value within a predetermined allowance.

16. An apparatus comprising:

a plurality of weighing cells, each weighing cell outputting a corresponding weight signal indicative of weight of articles loaded thereon; and a plurality of filters corresponding, respectively, to the plurality of weighing cells, each filter having an adjustable filter characteristic and filtering the weight signal of the corresponding weighing cell in accordance with the filter characteristic to provide a filtered weight signal, a plurality of vibration component detectors corresponding, respectively, to the plurality of filters, each vibration component detector detecting a vibration component from the filtered weight signal of the corresponding filter, a plurality of comparators corresponding, respectively, to the plurality of vibration detectors, each comparator comparing the detected vibration component of the corresponding vibration detector with a permissible level, to produce a comparison result, and a filter adjuster progressively adjusting the filter characteristics of the plurality of filters in accordance with the comparison results from a filter characteristic in which damping vibration is highest with the longest response time toward the filter characteristic in which damping vibration is lowest with the shortest response time, and setting the filter characteristic of each filter to the same filter characteristic which is at a level exhibited immediately before the vibration component has exceeded the permissible level.

17. An apparatus as in claim 16, further comprising:

a processor selecting a combination of the weighed articles based on the filtered weight signals to thereby calculate a combination which is approximating to a target value within a predetermined allowance.

18. An apparatus comprising:

a weighing cell outputting a weight signal indicative of a weight of an article loaded thereon;

a filter having an adjustable filter characteristic, the filter filtering the weight signal in accordance with the filter characteristic to provide a filtered weight signal; and a filter adjuster progressively adjusting the filter characteristic from a filter characteristic in which damping vibration is lowest with a shortest response time toward a filter characteristic in which damping vibration is highest with a longest response time, and setting the filter characteristic at a level where a vibration component of the filtered weight signal attains a magnitude approximating to, but not exceeding, a permissible level.

19. An apparatus comprising:

a weighing cell outputting a weight signal indicative of a weight of an article loaded thereon;

a filter having an adjustable filter characteristic, the filter filtering the weight signal in accordance with the filter characteristic to provide a filtered weight signal; and means for progressively adjusting the filter characteristic from a filter characteristic in which damping vibration is lowest with a shortest response time toward a filter characteristic in which damping vibration is highest with a longest response time, and for setting the filter characteristic at a level where a vibration component of the filtered weight signal attains a magnitude approximating to, but not exceeding, a permissible level.

20. An apparatus comprising:

a weighing cell outputting a weight signal indicative of a weight of an article loaded thereon;

a filter having an adjustable filter characteristic, the filter filtering the weight signal in accordance with the filter characteristic to provide a filtered weight signal; and a filter adjuster progressively adjusting the filter characteristic from a filter characteristic in which damping vibration is highest with the longest response time toward a filter characteristic in which damping vibration is lowest with the shortest response time, and setting the filter characteristic at a level exhibited immediately before a vibration component of the filtered weight signal has exceeded a permissible level.

21. An apparatus comprising:

a weighing cell outputting a weight signal indicative of a weight of an article loaded thereon;

a filter having an adjustable filter characteristic, the filter filtering the weight signal in accordance with the filter characteristic to provide a filtered weight signal; and means for progressively adjusting the filter characteristic from a filter characteristic in which damping vibration is highest with the longest response time toward a filter characteristic in which damping vibration is lowest with the shortest response time, and for setting the filter characteristic at a level exhibited immediately before a vibration component of the filtered weight signal has exceeded a permissible level.

22. An apparatus comprising:

a weighing cell outputting a weight signal indicative of a weight of an article loaded thereon; and a filter filtering the weight signal in accordance with a filter characteristic to provide a filtered weight signal, wherein the filter characteristic is progressively adjusted from a filter characteristic in which damping vibration is lowest with a shortest response time toward a filter characteristic in which damping vibration is highest with a longest response time, and then set at a level where a vibration component of the filtered weight signal attains a magnitude approximating to, but not exceeding, a permissible level.

23. An apparatus comprising:

a weighing cell outputting a weight signal indicative of a weight of an article loaded thereon;

a filter filtering the weight signal in accordance with a filter characteristic to provide a filtered weight signal, wherein the filter characteristic is progressively adjusted from a filter characteristic in which damping vibration is highest with the longest response time toward a filter characteristic in which damping vibration is lowest with the shortest response time, and then set at a level exhibited immediately before a vibration component of the filtered weight signal has exceeded a permissible level.

* * * * *

UNITED STATES PATENT AND TRADEMARK OFFICE
CERTIFICATE OF CORRECTION

PATENT NO. : 6,271,484 B1
DATED : August 7, 2001
INVENTOR(S) : Harunori Tokutsu

Page 1 of 1

It is certified that error appears in the above-identified patent and that said Letters Patent is hereby corrected as shown below:

<u>Title page,</u>
Item [75] change "Kurita-gun" to -- Shiga --.
Item [75] delete "-gun"
Item [73] change "Kurita-gun" to -- Kyoto --.
Item [56] References Cited;
The IDS filed by Applicant on 3/29/99 listed 6 references which were noted by Examiner Gibson on 2/16/00. These references were not listed on the patent. Please insert the following references:

| | | |
|---|---|---|
| -- 5,062,492 | 11/5/91 | Inoue |
| EP 0756158 A2 | 1/29/97 | EPO |
| 0016841 A1 | 10/15/80 | EPO |
| 0 622617A1 | 11/2/94 | EPO |
| 0656530A1 | 6/7/95 | EPO |
| EP0756158A3 | 11/1997 | EPO -- |

Signed and Sealed this

Twenty-fifth Day of December, 2001

Attest:

*Attesting Officer*

JAMES E. ROGAN
*Director of the United States Patent and Trademark Office*